(12) United States Patent
Hall et al.

(10) Patent No.: US 11,837,707 B2
(45) Date of Patent: Dec. 5, 2023

(54) BATTERY CELL INTERCONNECT AND METHODS OF MANUFACTURE THEREOF

(71) Applicant: Apple Inc., Cupertino, CA (US)

(72) Inventors: Jonathan L. Hall, Emerald Hills, CA (US); Luke A. Wilhelm, San Jose, CA (US); Qingcheng Zeng, San Jose, CA (US); Mujeeb Ijaz, Los Altos Hills, CA (US); Donald G. Dafoe, San Jose, CA (US)

(73) Assignee: Apple Inc., Cupertino, CA (US)

( * ) Notice: Subject to any disclaimer, the term of this patent is extended or adjusted under 35 U.S.C. 154(b) by 761 days.

(21) Appl. No.: 16/900,627

(22) Filed: Jun. 12, 2020

(65) Prior Publication Data

US 2020/0303712 A1      Sep. 24, 2020

Related U.S. Application Data

(62) Division of application No. 15/702,660, filed on Sep. 12, 2017, now Pat. No. 10,686,178.

(60) Provisional application No. 62/398,427, filed on Sep. 22, 2016.

(51) Int. Cl.
| | |
|---|---|
| *H01M 10/647* | (2014.01) |
| *H01M 10/625* | (2014.01) |
| *H01M 10/6554* | (2014.01) |
| *H01M 50/124* | (2021.01) |
| *H01M 50/258* | (2021.01) |
| *H01M 50/503* | (2021.01) |
| *H01M 50/209* | (2021.01) |

(52) U.S. Cl.
CPC ....... *H01M 10/647* (2015.04); *H01M 10/625* (2015.04); *H01M 10/6554* (2015.04); *H01M 50/124* (2021.01); *H01M 50/209* (2021.01); *H01M 50/258* (2021.01); *H01M 50/503* (2021.01); *H01M 2220/20* (2013.01)

(58) Field of Classification Search
CPC ............ H01M 10/647; H01M 10/625; H01M 10/6554; H01M 50/124; H01M 50/209; H01M 50/258; H01M 50/503; H01M 2220/20; H01M 10/613; Y02E 60/10
USPC ........................................................ 429/120
See application file for complete search history.

(56) References Cited

U.S. PATENT DOCUMENTS

| | | |
|---|---|---|
| 10,686,178 B1 | 6/2020 | Hall et al. |
| 2003/0194605 A1 | 10/2003 | Fauteux et al. |
| 2012/0202109 A1 | 8/2012 | Seo et al. |
| 2013/0045401 A1 | 2/2013 | Yoon et al. |
| 2015/0037617 A1 | 2/2015 | Cabiri |
| 2015/0034515 A1 | 10/2015 | Kayano et al. |

(Continued)

*Primary Examiner* — Gary D Harris
(74) *Attorney, Agent, or Firm* — Robert C. Kowert; Kowert, Hood, Munyon, Rankin & Goetzel, P.C.

(57) ABSTRACT

A battery cell includes a cathode casing forming all or a majority of the external can of the battery cell. The battery further includes an anode tab covering at least a portion of a face of the battery cell and an insulating layer for electrically isolating the anode tab from the cathode casing. A plurality of such battery cells may be arranged within a battery pack in contact with each other, and may be held in compression. A conduction enhancement layer may be applied between the anode tab of a first cell and the cathode casing of a second cell within the battery pack. One or more heat dissipation elements may be arranged within the battery pack, in contact with the battery cells.

20 Claims, 7 Drawing Sheets

(56) References Cited

U.S. PATENT DOCUMENTS

2017/0092924 A1\* 3/2017 Wakimoto .......... H01M 50/176
2018/0013124 A1 1/2018 Balaster
2018/0219261 A1 8/2018 Drews et al.

\* cited by examiner

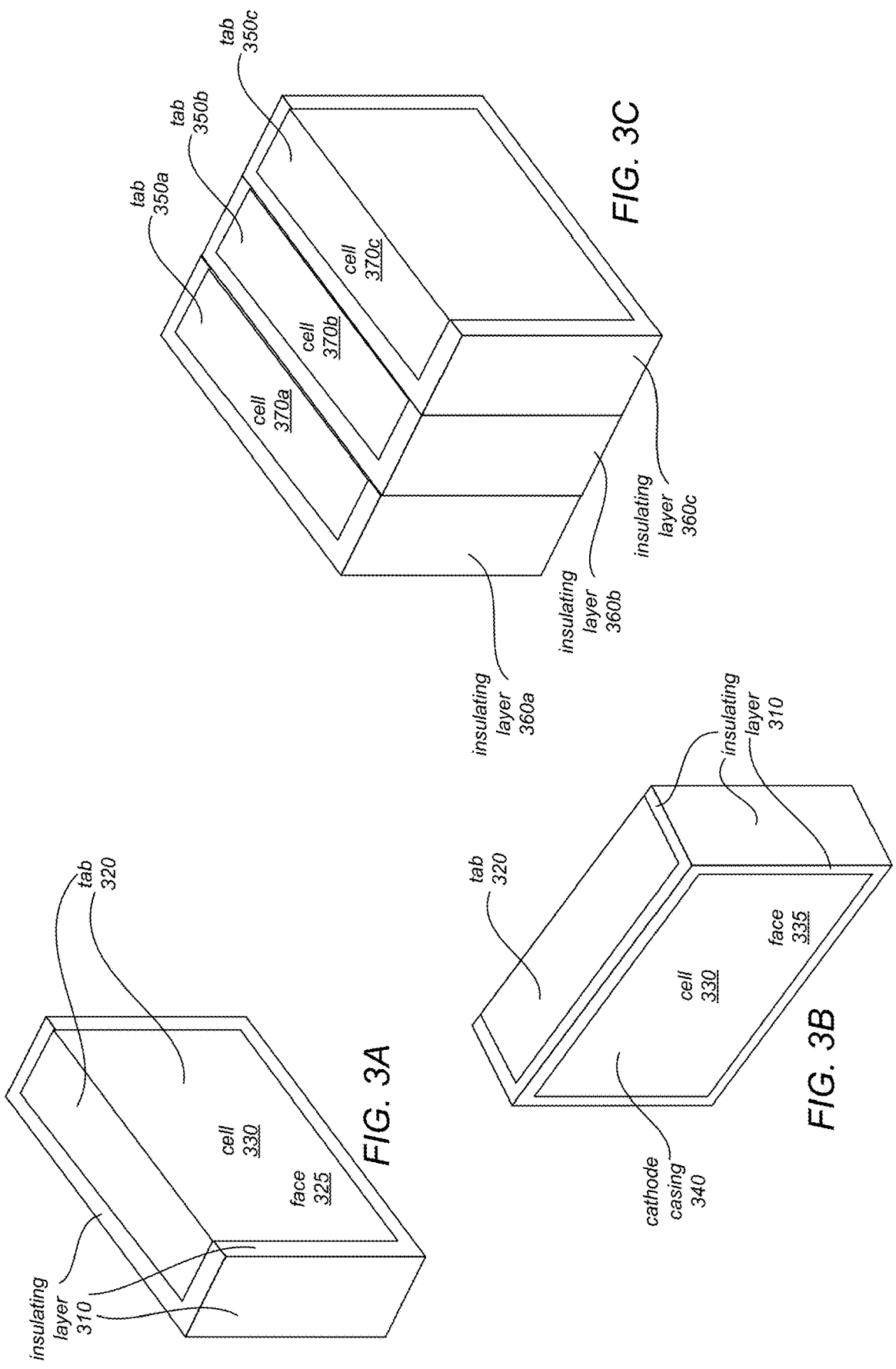

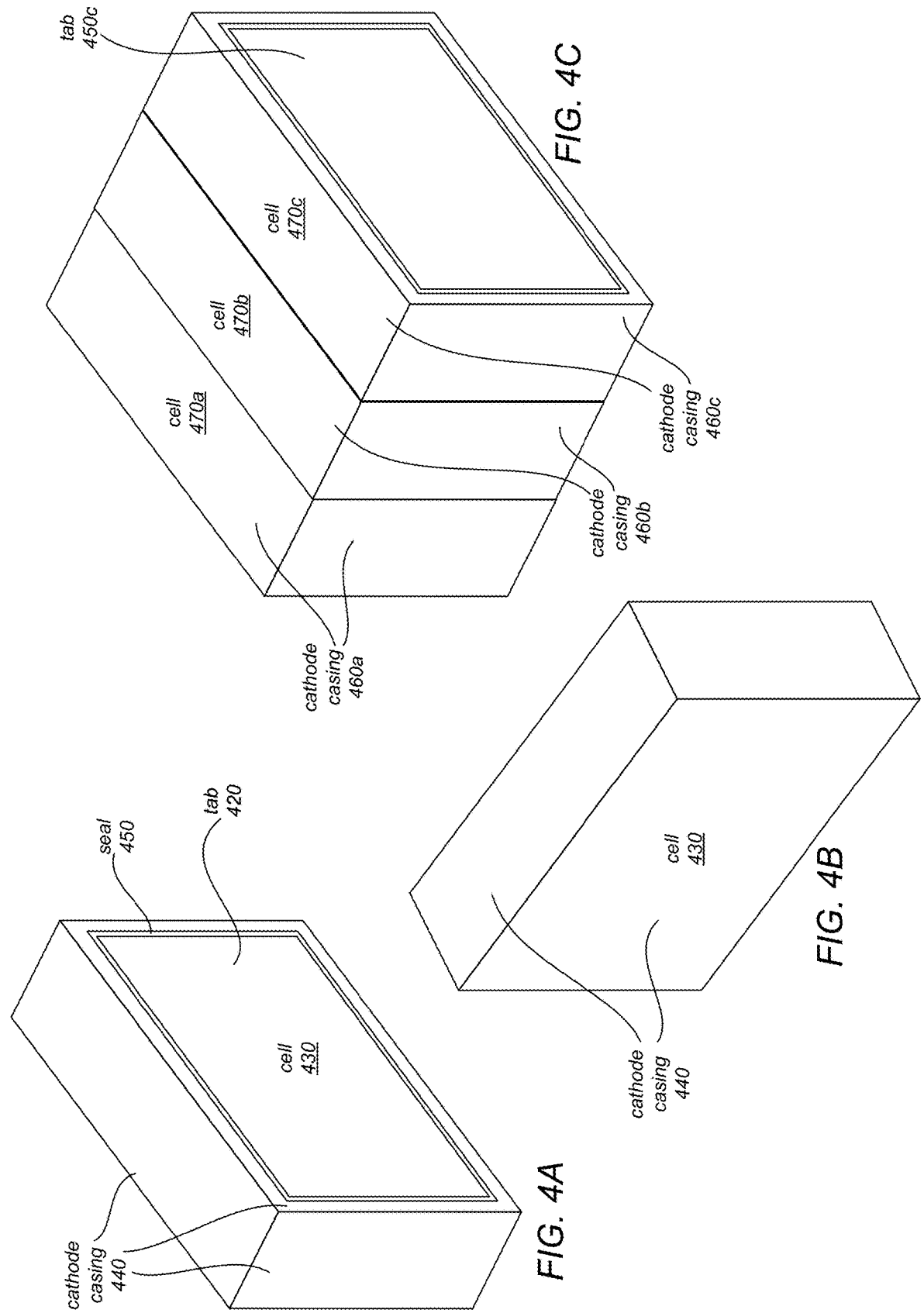

BATTERY CELL INTERCONNECT AND METHODS OF MANUFACTURE THEREOF

This application is a divisional of U.S. patent application Ser. No. 15/702,660, filed Sep. 12, 2017, which claims benefit of priority to U.S. Provisional Application No. 62/398,427, filed Sep. 22, 2016, which are hereby incorporated by reference in their entirety.

BACKGROUND

Battery packs are presently used to provide electrical power to numerous devices, including tools, vehicles, laptop and tablet computers, and mobile phones. In many applications, the physical space required for the battery pack or packs is a crucial design consideration that affects many aspects of a product, including physical size and shape and performance. For example, the available operational time of a portable electronic device and the physical range of an electronic vehicle are both directly affected by the volume of space available to the battery pack and the efficiency of usage of the available volume. In many battery pack applications, it is desirable to safely and efficiently maximize usage of battery pack volume, for example to add electrical capacity to the product, reduce the battery pack size, or to allow for more efficient cooling of a battery pack.

A common type of battery is a rechargeable battery with a lithium-based chemistry—for example, a lithium-ion or a lithium-polymer battery. Lithium-ion and lithium-polymer batteries typically contain a cathode current collector; a cathode comprised of an active material, a separator, an anode current collector; and an anode comprised of an active material. The cathode can comprise a cathode coating, and the anode can comprise an anode coating. The cathode, separator, and anode assembly is typically assembled in a cylindrical or prismatic "jelly roll" configuration within a battery casing, with conducting anode and cathode conducting terminals, arranged to protrude into its corresponding active material and allow for a point of electrical connection external the battery casing. A battery casing of existing batteries may typically be neutral, but also may be at cathode (positive) potential or anode (negative) potential.

Existing battery packs typically use a bus bar or another similar means including one or more conductor separate from the battery cells, which is usually welded to terminals of a battery cell to form an interconnection system. The bus bar and similar interconnection systems consume space within a battery pack that could be used for other purposes if a more efficient battery interconnect system were to be implemented.

SUMMARY

A battery cell is configured to maintain electrical communication with other battery cells within a battery pack by being in physical contact with one or more other cells within the pack. A battery cell includes a cathode casing forming all or a majority of the external can of the battery cell. The battery further includes an anode tab covering at least a portion of a face of the battery cell and an insulating layer for electrically isolating the anode tab from the cathode casing. A plurality of such battery cells may be arranged within a battery pack in contact with each other, and may be held in compression. A conduction enhancement layer may be applied between the anode tab of a first cell and the cathode casing of a second cell within the battery pack.

Some embodiments include one or more fuses integrated with the anode tab or as part of the cathode casing. One or more heat dissipation elements may be arranged within the battery pack, in contact with the battery cells. Some embodiments include a flexure section built into the anode tab, for example to accommodate a compression force holding a string of battery cells in physical contact.

BRIEF DESCRIPTION OF THE DRAWINGS

FIG. 3A is an isometric external view of a battery cell including an anode tab according to some embodiments.

FIG. 3B is an another isometric external view of the battery cell of FIG. 3A according to some embodiments.

FIG. 3C is an isometric external view of three battery cells in series contact according to some embodiments.

FIG. 4A is an isometric external view of an additional example battery cell according to some embodiments.

FIG. 4B is another isometric external view of the battery cell of FIG. 4A according to some embodiments.

FIG. 4C is another isometric external view of three example battery cells in series contact according to some embodiments.

Figure 1:
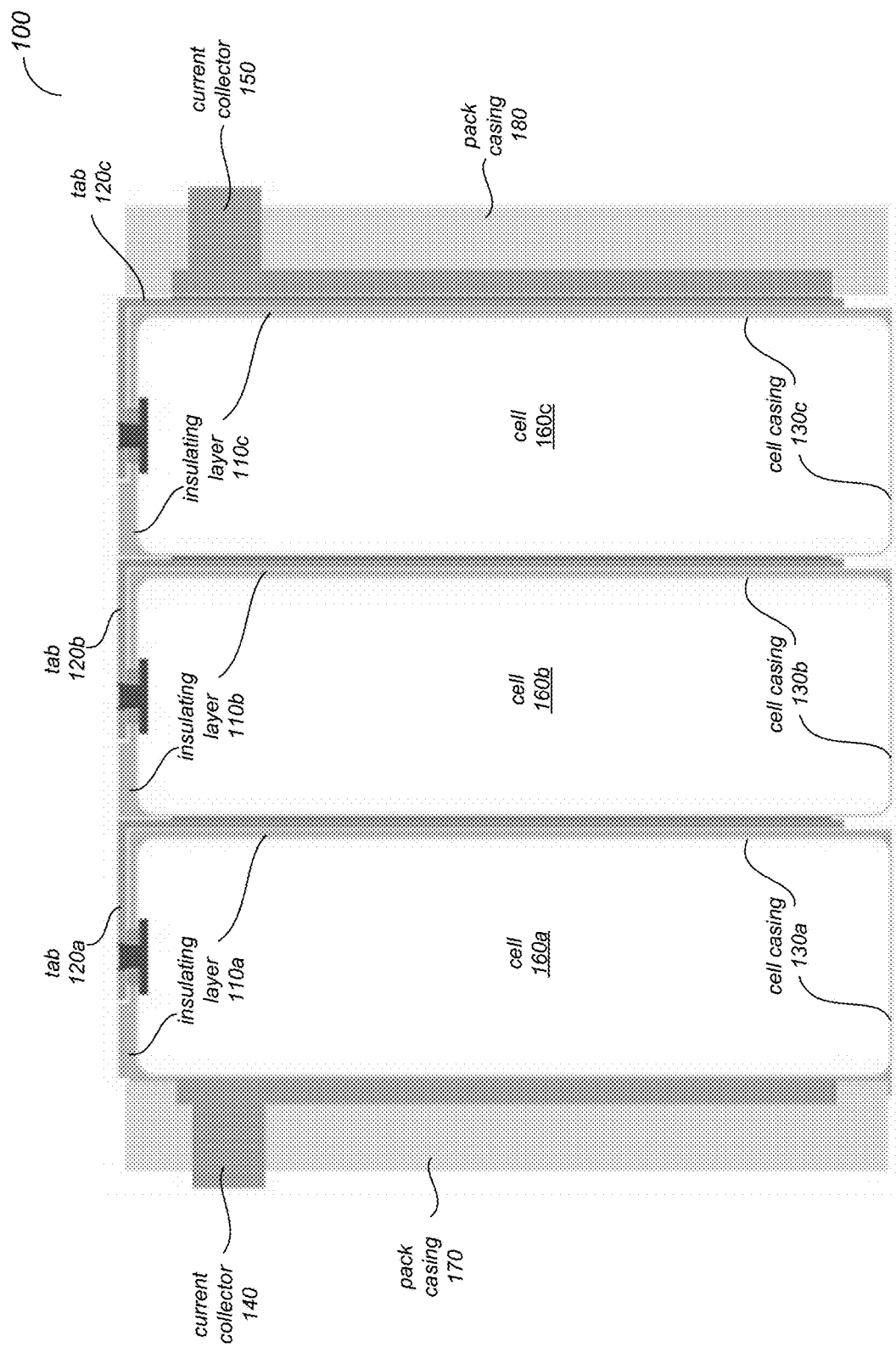
FIG. 1 illustrates a cross section of an example battery pack including three cells configured to implement an interconnect according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement battery cell interconnection.

FIG. 1 illustrates a cross section of an example battery pack including three cells configured to implement an interconnect according to some embodiments. Battery pack 100 may include cells 160a-160c according to some embodiments. Other embodiments may include any number of cells 160 depending on specific requirements of the application (e.g. an electric vehicle or handheld electronic device) for which the battery pack is meant. Cells 160 may be connected in any combination of series or parallel connections according to a particular desired voltage and energy capacity configuration.

According to some embodiments, at least one cell 160a-160c includes a conductive tab 120a-120c, respectively. Tabs 120a-120c in a typical embodiment may be an anode (positive) tab connected to one or more anode protrusions of its respective battery cell. In other embodiments, tabs 120a-120c may instead be at cathode potential. In the example embodiment of FIG. 1, a tab 120 may be electrically connected to active material of the cell through a top face of a cell 160 and protrude around the exterior of the cell 160 to form a planar tab. In the example embodiment of FIG. 1, cells 160a-160c are rectangular in shape and tabs 120a-120c may include a right angle around one corner the exterior of the respective cell. In some embodiments according to FIG. 1, a tab 120a-120c may cover a majority of the exterior of at least one face of the respective cell 160.

One or more of cells 160a-160c according to some embodiments further include a cell casing (or external can) 130a-130c. According to some embodiments, all or a majority of the cell casing 130 of a particular cell may be at cathode potential. In other embodiments, the polarity of the cell casing 130 and the tab 120 may be reversed such that the tab 120 becomes a cathode tab and the cell casing 130 is at anode potential.

According to some embodiments, a cell casing 130 may form all or a majority of the surface area of the external can or container of the cell. In other embodiments, the cathode potential portion may be further limited, for example to a majority of one face of the cell opposite a tab 120.

Figures 5A, 5B:
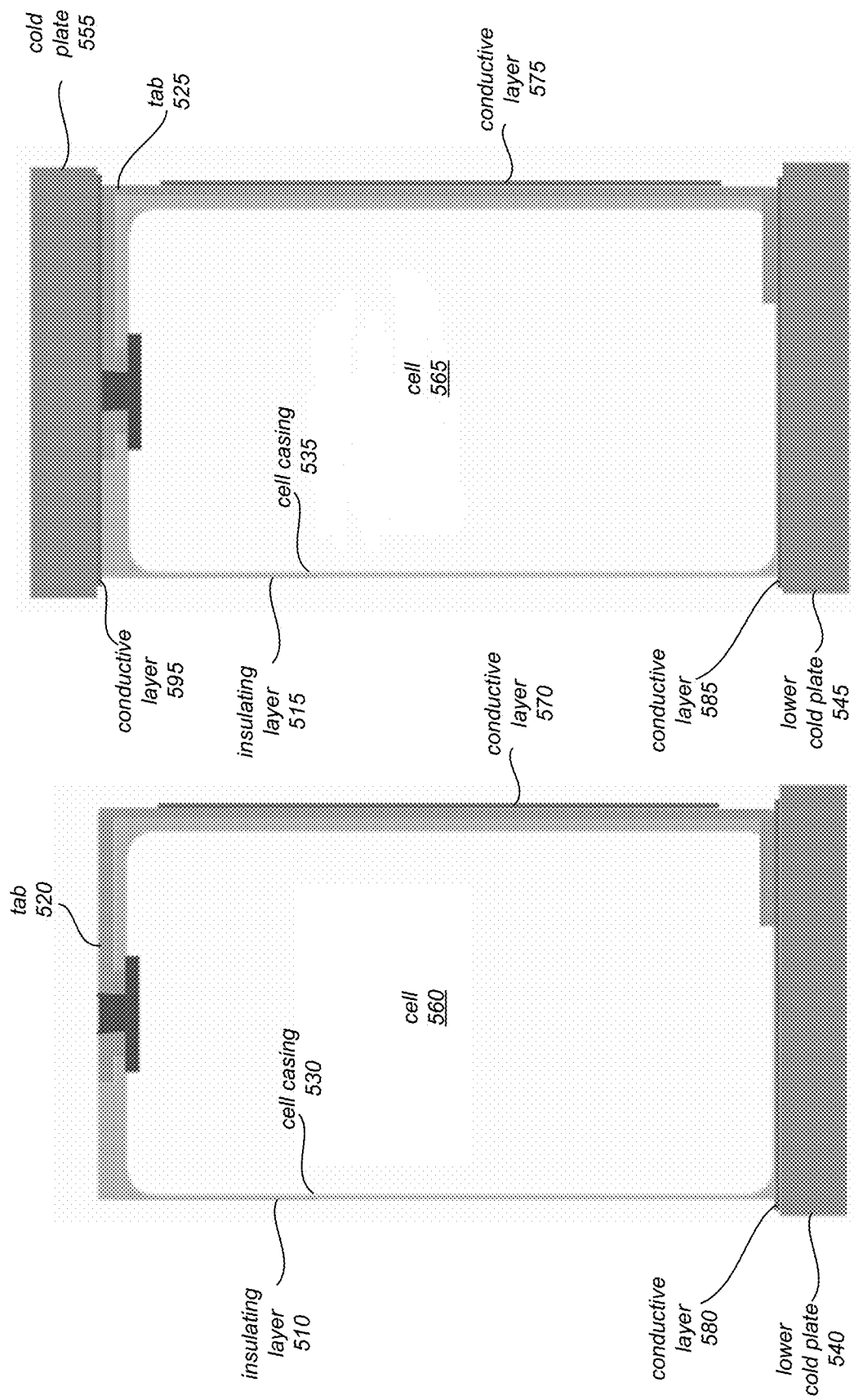
FIG. 5A illustrates a cross section of a battery cell in contact with a cold plate according to some embodiments.
FIG. 5B illustrates a cross section of a battery cell in contact with multiple cold plates according to some embodiments.

Configuring a cell casing 130 as a conductor at an anode or cathode potential may allow for more efficient cooling opportunities, as further described herein with reference to FIGS. 5A and 5B. For example, a larger conductive surface area as a result of such an arrangement as shown and described with reference to FIG. 1 and elsewhere herein may allow for a more efficient heat sink, resulting for example in reduced thermal concentration within a battery cell or reduced overall operating temperatures. Both of those conditions may prolong the operational life span of a battery cell or its components, such as active material, separators, insulation, electrolyte seals, etc.

Insulating layers 110a-110c may be applied to electrically isolate a tab 120 from a cell casing 130. An insulating layer 110 may include, for example, a suitable polymer formed or applied around the desired sections. Any substance having current inhibiting properties may be appropriate to form an insulating layer, as one of ordinary skill will understand. In the example embodiments of FIG. 1, insulating layers 110a-110c are shown between respective cell casings 130a-130c and tabs 120a-120c on at least one face of the battery and a portion of the top of the battery.

At least a portion of one face of a battery cell 160a-160c may be left uncovered by an insulating layer in order to allow for electrical communication with another cell by being positioned in physical contact with an adjacent cell. For example, in the embodiment shown in FIG. 1, tab 120a of cell 160a physically contacts cell casing 130b of cell 160b without an intervening insulating layer. Assuming tab 120a is configured at an anode potential of cell 160a and cell casing 130b is configured at a cathode potential of cell 160b, this physical contact forms a series electrical connection between cells 160a and 160b.

Current collectors 140 and 150 according to some embodiments may form electrical terminals of pack 100. For example, current collector 140 may be electrically coupled to a cathode potential of a string of battery cells 160a-160c. Current collector 150 according to some embodiments may be electrically coupled to an anode potential of a string of battery cells 160a-160c. In other embodiments, the polarity of current collectors 140 and 150 may be reversed.

Pack casings 170 and 180 according to some embodiments may form an external enclosure of pack 100. In some embodiments, pack casings 170 and 180 may be formed of any suitable material, for example a nonconductive plastic or polymer. Pack casings 170 and 180 may in some embodiments be two faces of a continuous enclosure, or may be physically separate faces or plates, as shown in the embodiment of FIG. 1.

Current collectors 140 and 150 according to some embodiments may form the exclusive or primary conducting terminals of a pack 100. In some embodiments, current collectors 140 and 150 may protrude from or otherwise be exposed by an opening in a pack casing of pack 100. The example of FIG. 1 illustrates current collector 140 protruding through an opening in pack casing 170 and current collector 150 protruding through an opening in pack casing 180.

Cells 160a-160c according to some embodiments may be held in compression in physical contact with one another. For example, pack casings 170 and 180 may be arranged in some embodiments to provide a compressing force to a string of cells 160a-160c. In some embodiments, current collector 140 and current collector 150 may act as compression plates in combination with or in lieu of compression provided by pack casings 170 and 180. Other embodiments may use a compression plate or strap (not shown) separate from pack casings 170 and 180 or current collectors 140 and 150 to provide compressive force to a string of battery cells 160a-160c.

A compressive force applied to a string of battery cells according to some embodiments may increase efficiency or reliability of the electrical connections between the string of battery cells 160a-160c. In some embodiments, a pressure-sensitive adhesive layer may be applied between various components of battery pack 100 to increase mechanical strength or reliability of the battery pack. For example, an adhesive such as a pressure-sensitive adhesive ("PSA") may be applied between tab 120a and cell casing 130b—or between similar components of any cells in a battery string—according to some embodiments. In other embodiments, an adhesive may be applied between current collectors 140 and 150 or pack casings 170 and 180 and adjacent cells, or between an insulating layer and a tab 120 or cell casing 130.

Figure 2:
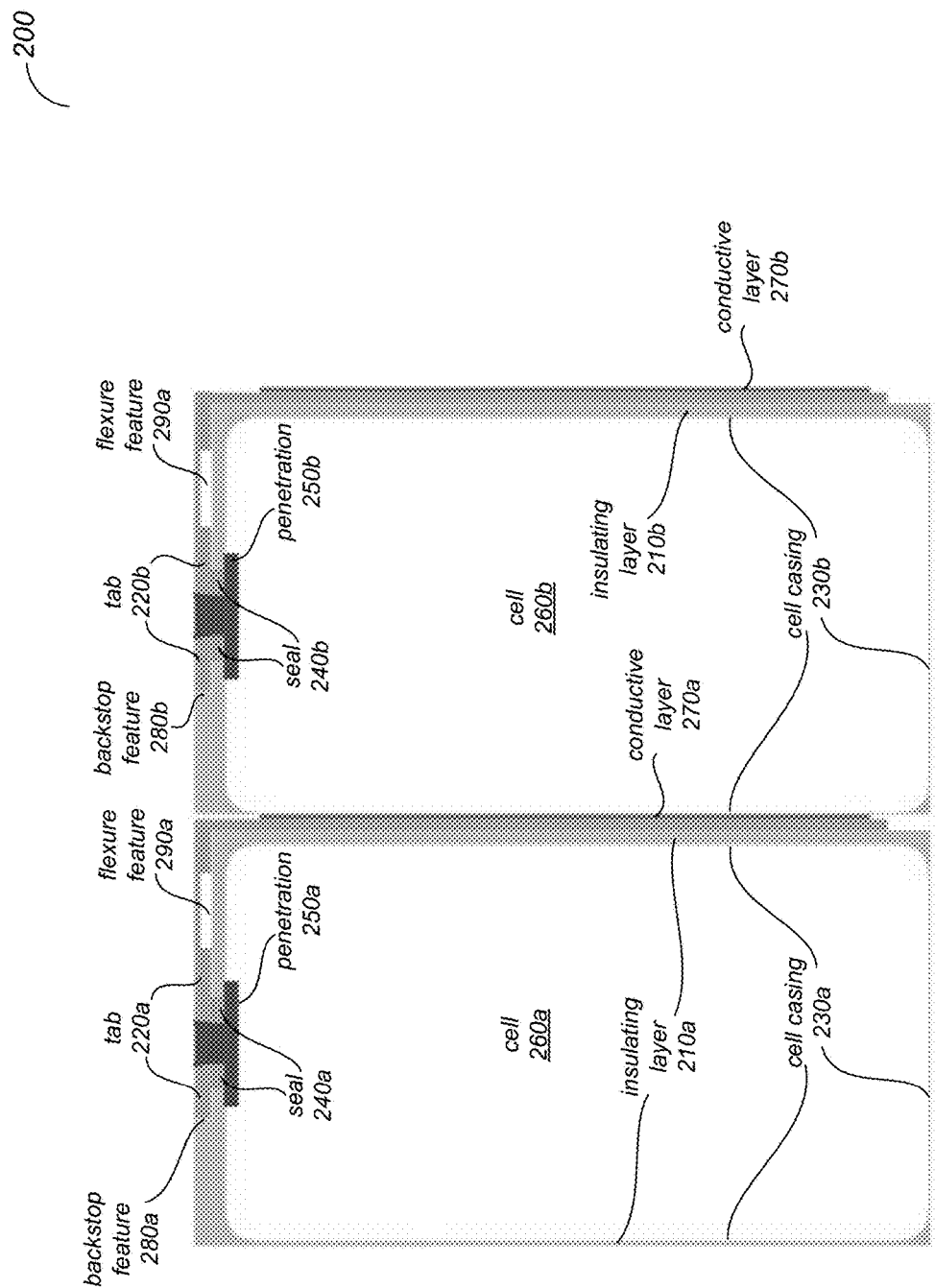
FIG. 2 illustrates a cross section of two battery cells in electrical communication according to some embodiments.

FIG. 2 illustrates a cross section of two battery cells in electrical communication according to some embodiments. Example cells 260a and 260b may include respective tabs 220a-220b, cell casings 230a-230b, and insulating layers 210a-b similar to those respective features as described in detail with reference to FIG. 1.

A conductive layer 270a-270b may be applied to a face of a respective tab 220a-220b. For example, a conductive layer 270a may be applied between tab 220a of cell 260a and cell casing 230b of cell 260b to improve electrical conductivity between cells 260a and 260b. In some embodiments, a conductive layer 270a-270b may be applied to a respective tab 220a-220b or to a portion of respective cell casing 230a-230b during fabrication of a respective cell 260a-260b.

A conductive layer 270a-270b may be a conduction aid material, for example Penetrox®. According to some embodiments, a conductive layer 270a-270b may comprise a metallic or alloy plating. In other embodiments, a conductive layer 270a-270b may comprise any suitable material for enhancing or promoting electrical conduction, we would be apparent to a person having ordinary skill in the art.

According to some embodiments, one or more of cells 260a-260b may further include one or more respective feed-throughs or penetrations 250a-250c, which protrude into the interior of the respective cell. A feed-through or penetration 250a-250b may be a conducting material in electrical or physical contact with active material of a respective cell 260a-260b. For example, one or more of feed-throughs or penetrations 250a-250b may contact anode active material of respective cells 260a-260b.

An anode feed-through or penetration 250a-250b according to some embodiments may be affixed to a respective tab 220a-220b, for example by laser welding or another of numerous possible attachment methods as will be apparent to one having ordinary skill in the art. Where a tab 220a-220b covers all or a portion of the width of a respective cell 260a-260b, multiple feed-throughs or penetrations 250a-250b may be possible within a cell, allowing for higher current capacity, better conductive efficiency, or less residual heat within a cell versus a typical design which may include only a single feed-through or penetration or very limited possible penetration area.

In other embodiments, a similar improvement to current capacity or conductive efficiency may be realized by increasing the size of a feed-through or penetration, for example by using long feed-throughs or penetrations 250a-250b positioned inside a substantial portion of a width of a face of a respective battery cell 260a-260b. In some embodiments, an enlarged feed-through or penetration 250a-250b may be affixed to a respective tab 220a-220b at multiple points, or via a continuous attachment method such as a continuous longitudinal weld along a length of a feed-through or penetration 250a-250b.

Example cells 260a-260b may include one or more respective seals 240a-240b. According to some embodiments, a seal 240a-240b may surround a respective feed-through or penetration 250a-250b, for example to prevent electrolytes from escaping a respective battery cell 260a-260b via an opening in the cell casing fabricated to accommodate an intrusion of a respective feed-through or penetration 250a-250b. A seal 240a-240b according to some embodiments may be made at least in part of a Perfluoro-alkoxy alkane ("PFA") material or another suitable material as will be apparent to one having ordinary skill in the art.

A cell 260a-260b may include a respective backstop feature 280a-280b to better accommodate shear forces as a result of battery cells being compressed together according to some embodiments. Backstop feature 280a-280b may include a staggered "staircase" or other suitable structure built into an insulating layer or cell casing of a respective cell 260a-260b. Although a simple stair structure is illustrated in FIG. 2, one of ordinary skill in the art will understand that many different suitable structures may be employed to accommodate increased shear forces.

A cell 260a-260b according to some embodiments may include a respective flexure feature 290a-290b to add flexibility to a respective tab 220a-220b for accommodating shear forces as a result of battery cells being compressed together. As illustrated in the example cells of FIG. 2, flexure feature 290a-290b is represented as a notch in respective tab 220a-220b, however one of ordinary skill in the art will appreciate that a tab 220 may be fabricated using any of many possible structures with similar results.

FIG. 3A is an isometric external view of a battery cell including an anode tab according to some embodiments. Cell 330 includes a conducting tab 320, which according to some embodiments covers a majority of a top and a majority of a side face 325 of cell 330.

An insulating layer 310 covers the remainder of the exterior portion of cell 330 visible in FIG. 3A. As described elsewhere herein, an insulating layer may be applied to electrically isolate tab 310 from the conductive casing of cell 330, which may be at cathode potential.

FIG. 3B is an another isometric external view of the battery cell 330 of FIG. 3A according to some embodiments. FIG. 3B shows a face 335 of cell 330 opposite face 325 illustrated at FIG. 3A. Cathode casing 340 may be exposed across part or all of face 335 according to some embodiments. The example cell 330 of FIG. 3B illustrates cathode casing exposed across a majority of face 335.

FIG. 3C is an isometric external view of three battery cells in series contact according to some embodiments. According to some embodiments, cells 370a-370c may be similar or identical to battery cell 330 of FIGS. 3A and 3B. Tabs 350a-350c of respective cells 370a-370c may be configured to contact a cathode casing (not pictured in FIG. 3C) of an adjacent cell. For example, as illustrated at FIG. 3C, tab 350*a* of cell 370*a* may contact a cathode casing of cell 370*b*, while tab 350*b* of cell 37*b* may contact a cathode casing of cell 370*c*.

Insulating layers 360*a*-360*c* of respective cells 370*a*-370*c* are visible at FIG. 3C. As described elsewhere herein, insulating layers 360 may be applied to electrically isolate tabs 350*a*-350*c* from respective cathode casings (not illustrated at FIG. 3C) of cells 370*a*-370*c*.

FIGS. 4A and 4B show isometric external views of opposite sides of an additional example battery cell according to some embodiments. Example cell 430 according to some embodiments includes a tab 420 which forms part or a majority of one face of battery cell 430. Tab 420 according to some embodiments may be an anode tab as described in detail herein. Means of electrical connection of tab 420 to active material of cell 430 similar to other example cells described in detail herein may be fabricated within the cell rather than, for example, the external tab of cells 260*a*-260*b* of FIG. 2.

The remainder of the exterior boundary of example cell 430 may be a cathode casing 440 as shown in FIGS. 4A and 4B. A seal 450 may be positioned to electrically isolate tab 420 from cathode casing 440. Seal 450 according to various embodiments may be any nonconducting material, for example a PFA material, rubberized material, or other material suitable for forming an insulating layer described elsewhere herein.

According to some embodiments, tab 420 may form an extruded section. In other embodiments, tab 420 may be recessed from or flush with the plane of cathode casing 440. In some example embodiments, an extruded tab 420 may aid in maintaining electrical contact with a cathode casing of an adjacent cell. In other embodiments, a similar function may be accomplished by combining a recessed tab 420 section with an extruded cathode casing section at a face of cell 430 opposite tab 420.

FIG. 4C is another isometric external view of three example battery cells in series contact according to some embodiments. Example cells 470*a*-470*c* may be similar or identical to battery cell 430 of FIGS. 4A and 4B. Tabs 450*a*-450*c* (450*a* and 450*b* not visible) of respective cells 470*a*-470*c* may be configured to contact a cathode casing 460*a*-460*c* of respective adjacent cells 470*a*-470*c*. For example, as illustrated at FIG. 4C, tab 450*a* (not visible) of cell 470*a* may contact cathode casing 460*b* of cell 470*b*, while tab 450*b* (not visible) of cell 470*b* may contact cathode casing 460*c* of cell 470*c*.

FIG. 5A illustrates a cross section of a battery cell in contact with a cold plate according to some embodiments. Example cell 560 may include a tab 520, cell casing 530, insulating layer 510 and conductive layer 570 similar to those described in detail elsewhere herein.

Example cell 560 may additionally include a lower cold plate 540 in contact with a bottom face of example cell 560 for conducting heat away from the cell. Lower cold plate 540 may be formed of aluminum or another material suitable for conducting heat, as one having ordinary skill in the art would understand. A second conductive layer 580 may be applied between cell 560 and lower cold plate 540 according to some embodiments to aid transmission of heat between the cell 560 and lower cold plate 540.

FIG. 5B illustrates a cross section of a battery cell in contact with multiple cold plates according to some embodiments. Example cell 565 may include a tab 525, cell casing 535, insulating layer 515, and conductive layer 575 as described in detail elsewhere herein. Example cell 565 may additionally include a lower cold plate 545 similar to the lower cold plate described with reference to FIG. 5A and a second conductive layer 585 positioned between cell 565 and lower cold plate 545.

Example cell 565 according to some embodiments may further include an upper cold plate 555 positioned in contact with a top face of example cell 565 for conducting heat away from cell 565. A third conductive layer 595 may be positioned between cell 565 and cold plate 555 for aiding transmission of heat to cold plate 555.

In some embodiments, cold plates may be positioned on different faces of example cells besides the configurations illustrated herein. In still other embodiments, cold plates may be replaced with another means of conducting heat away from a cell, such as thermal channels, a heat exchange system, or liquid cooling system of a surrounding battery pack, as one having ordinary skill in the art will recognize.

Figures 6A, 6B:
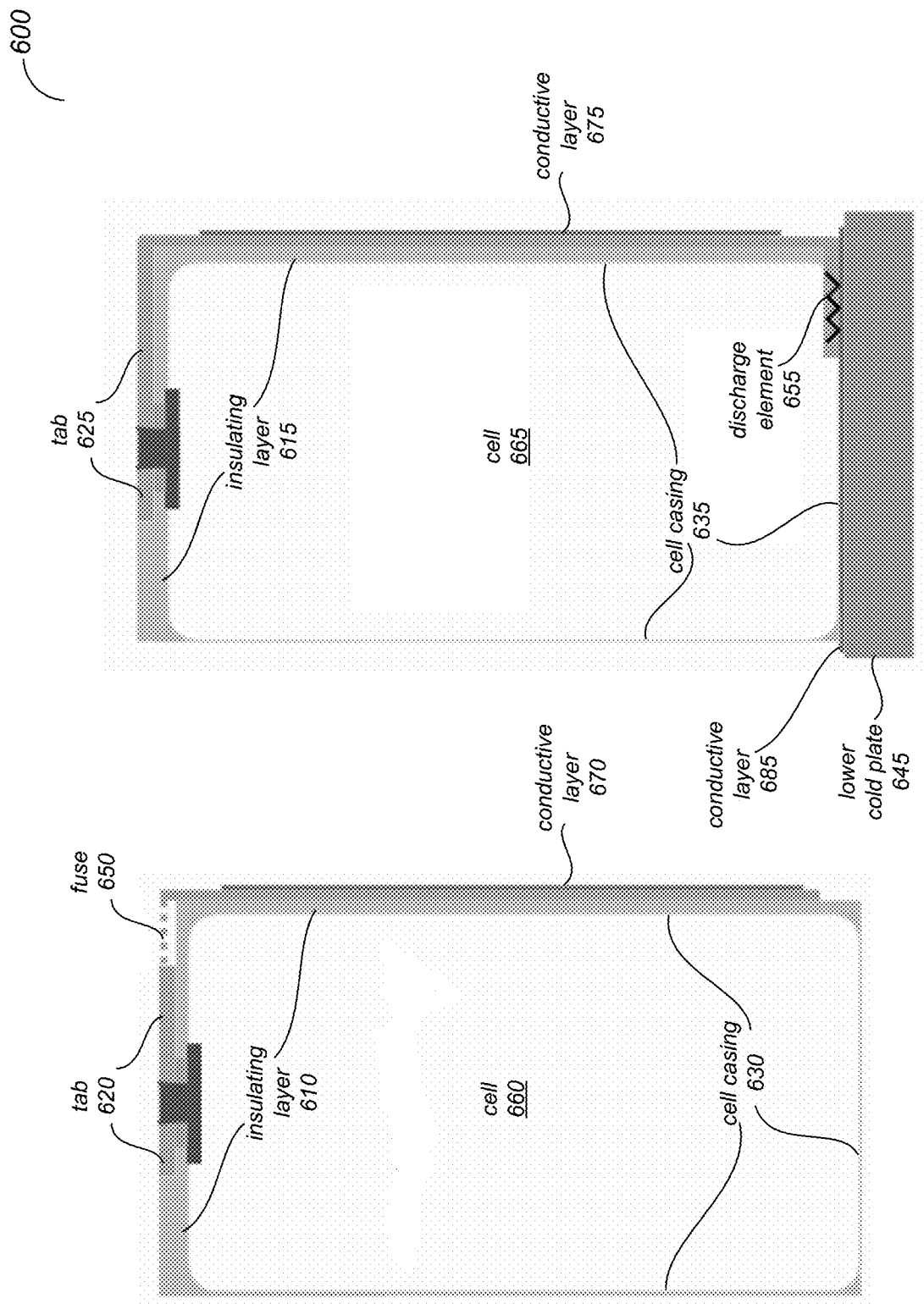
FIG. 6A illustrates a cross section of a battery cell including a fuse according to some embodiments.
FIG. 6B illustrates a cross section of a battery cell including a discharge element according to some embodiments.

FIG. 6A illustrates a cross section of a battery cell including a fuse according to some embodiments. Example cell 660 according to some embodiments may include a tab 620, cell casing 630, insulating layer 610, and conductive layer 670 similar to those described in detail elsewhere herein.

Example cell 660 of FIG. 6A may further include a fuse 650 for restricting flow of current through cell 660 under certain circumstances. For example, a fuse 650 may be configured to restrict flow of electric current when cell 660 experiences an overcurrent condition, overvoltage condition, overtemperature condition, or other condition as would be apparent to one having ordinary skill in the art.

Fuse 650 of example cell 660 is illustrated as being integrated into tab 620. However, one of ordinary skill in the art will recognize that fuse 650 may be implemented in a different manner or location. For example, fuse 650 according to some embodiments may be integrated into cell casing 630 or at any other suitable location within a conducting path of cell 660.

FIG. 6B illustrates a cross section of a battery cell including a discharge element according to some embodiments. Example cell 665 according to some embodiments includes a tab 625, a cell casing 635, an insulating layer 615, and a conductive layer 675 similar to those described in detail elsewhere herein.

Example cell 665 of FIG. 6B may additionally include a discharge element 655 for bleeding excess charge from battery cell 665. Cell discharge may be desirable for several reasons, such as battery balancing or storage safety. Discharge element 655 may include, for example, one or more resistors or transistors such as field-effect transistors. One of ordinary skill in the art will recognize that other means of discharging a cell may be employed according to materials available and design requirements.

Example cell 665 of FIG. 6B may additionally include a lower cold plate 645 in contact with discharge element 655 and cell 665. The conductive properties of cold plate 645 may aid in efficient discharge of cell 665. Cell 665 according to some embodiments may additionally include a conductive layer 685 positioned between discharge element 655 and lower cold plate 645.

Figure 7:
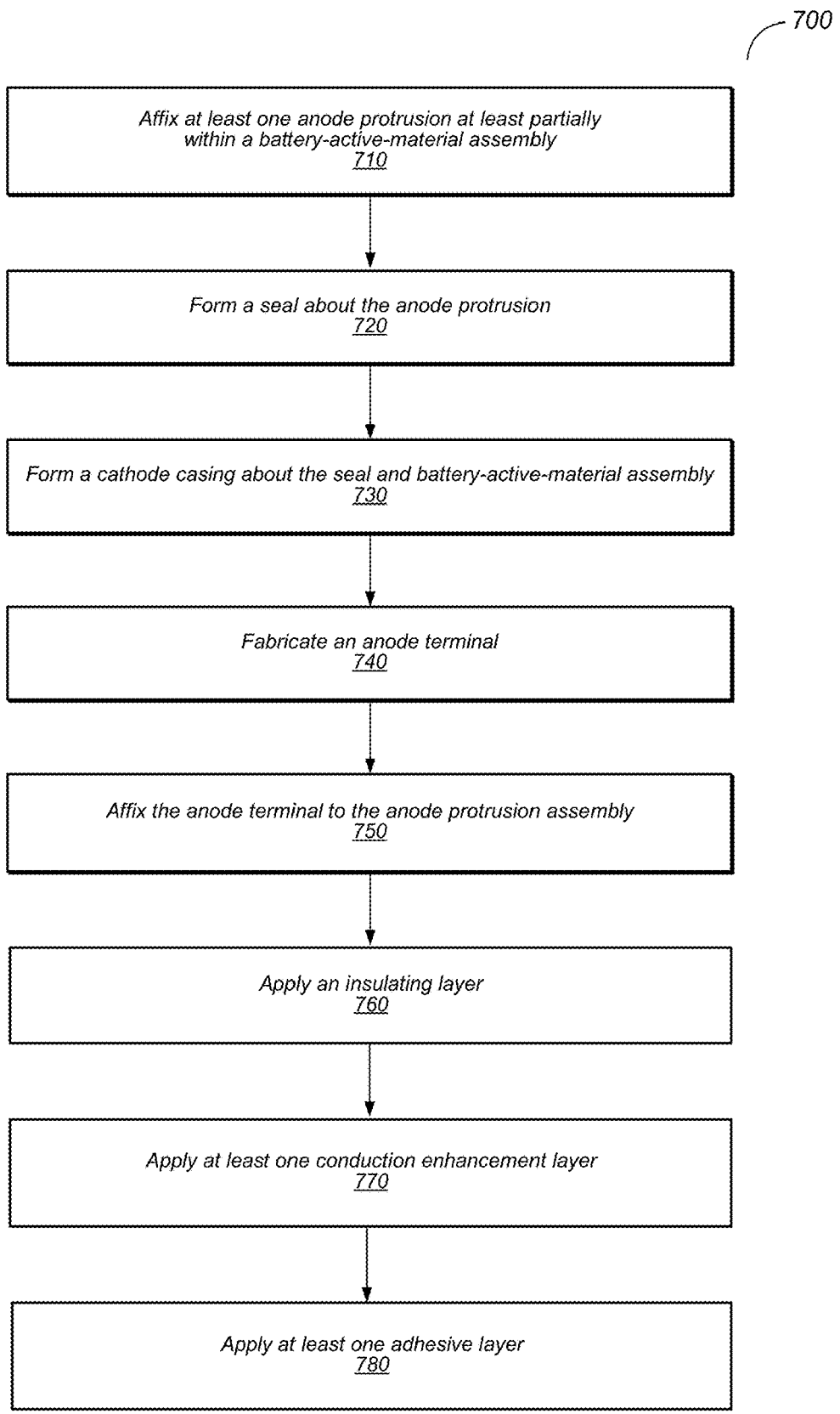
FIG. 7 is a high-level flowchart illustrating various methods of fabricating a battery cell according to some embodiments.

FIG. 7 is a high-level flowchart illustrating various methods of fabricating a battery cell according to some embodiments. Various embodiments may include several or all of the steps described herein with reference to FIG. 7, and the order of some steps may be changed according to various embodiments.

Step 710 of process 700 includes affixing at least one anode protrusion at least partially within a battery-active-material assembly. The battery-active-material assembly according to some embodiments may be a prismatic or cylindrical "jelly roll" type cathode/separator/anode assembly as described elsewhere herein, or another suitable assembly. According to some embodiments, an anode protrusion affixed at step 710 may be similar to those described with reference to FIG. 2.

Step 720 of process 700 includes forming a seal about the anode protrusion. The seal plugs any excess opening in a battery casing around the anode protrusion, and may in some embodiments be similar to the electrolyte seals described elsewhere herein.

Step 730 includes forming a cathode casing about the seal and battery-active material assembly. The cathode casing may be similar to those described in detail herein. For example, the cathode casing may form a majority of the exterior can of the battery cell. In other embodiments, the casing may instead be at anode potential. In some embodiments, part of the casing may be a nonconducting material or at a neutral potential.

Step 740 includes fabricating an anode terminal. The anode terminal may be of various designs and configurations and described in detail and suggested herein, for example an anode tab. Step 750 may include attaching the anode terminal to the battery cell, for example by laser welding to one or more anode protrusions according to various embodiments.

Step 760 includes applying an insulating layer similar to various layers described herein. For example, an insulating layer may be applied between the cathode casing and the anode terminal. An insulating layer may additionally be applied to other parts of a battery cell, for example to electrically insulate a battery at the end of a string from a wall of a battery pack enclosure.

Step 770 includes applying at least one conduction enhancement layer. For example, as described herein, a conduction enhancement layer may be applied to an external surface of an anode terminal tab at a location that contacts a cathode casing of an adjacent cell, as described in further detail elsewhere herein. Various embodiments may include additional conductive layers, for example between a cell and a cold plate or other battery cooling means.

Step 780 includes applying at least one adhesive layer. An adhesive layer may be applied, for example, between an anode terminal tab and an insulating layer, or between a cold plate and a battery cell. The adhesive layer according to various embodiments may be a pressure-sensitive adhesive as described herein or another suitable material.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A battery, comprising:
    a positive active material and a negative active material, the positive and negative active materials arranged in a prismatic configuration;
    a cathode casing in electrical communication with the positive active material, the cathode casing forming a majority of the surface area of an external can of the battery;
    an anode terminal in electrical communication with the negative active material, the anode terminal comprising a conducting tab;
    an insulating layer, the insulating layer arranged to electrically isolate the cathode casing from the anode terminal.

2. The battery of claim 1, wherein at least a portion of the anode terminal is external to the cathode casing and planar with respect to a face of the battery.

3. The battery of claim 1, further comprising an anode penetration assembly in electrical communication with the anode terminal, wherein the anode penetration assembly intrudes into an interior of the battery at a plurality of points.

4. The battery of claim 1, further comprising a pressure-sensitive adhesive applied between the anode terminal and the insulating layer.

5. The battery of claim 1, wherein the anode terminal further comprises a fuse for interrupting a current flow via the anode terminal when the battery experiences an overcurrent condition.

6. The battery of claim 1, further comprising a cell discharge resistor, the cell discharge resistor contacting a conducting portion of the battery and a current discharge plate.

7. The battery of claim 1, further comprising an electrolyte seal positioned about an opening in the cathode casing, the opening associated with a protrusion of a portion of the anode terminal into the interior of the cathode casing.

8. The battery of claim 7, wherein the electrolyte seal comprises perfluoroalkoxy alkane (PFA).

9. The battery of claim 1, further comprising a conduction enhancement layer between the anode terminal and a second cathode casing of a second battery.

10. The battery of claim 9, wherein the conduction enhancement layer comprises a contact aiding material.

11. The battery of claim 9, wherein the conduction enhancement layer comprises a metallurgical plating.

12. The battery of claim 1, further comprising:
    a positive current collector in electrical communication with the cathode casing.

13. The battery of claim 1, further comprising:
    a negative current collector in electrical communication with an anode of another battery.

14. The battery of claim 1, further comprising a heat dissipation element, the heat dissipation element in contact with the anode terminal.

15. The battery of claim 14, wherein the heat dissipation element comprises a cold plate.

16. The battery of claim 1, wherein the battery is rectangular in shape.

17. The battery of claim 1, wherein a portion of the external can of the battery comprises an insulating material.

18. The battery of claim 1, further comprising a first heat dissipation element that is in contact with the anode terminal, and a second heat dissipation element that is in contact with a face of the external can of the battery, the face situated on a side of the battery opposite to the anode terminal.

19. The battery of claim 1, further comprising a discharge element including a transistor, the discharge element configured to bleed excess charge from the battery.

20. The battery of claim 19, further comprising a conductive layer situated between the discharge element and a heat dissipation element that is electrically conductive.

* * * * *